United States Patent

Kasahara

[11] Patent Number: 5,934,665
[45] Date of Patent: Aug. 10, 1999

[54] SEPARATION MECHANISM FOR SEPARATING AND FEEDING PAPER SHEET

[75] Inventor: Rikio Kasahara, Yokohama, Japan

[73] Assignee: Ricoh Company, Ltd., Tokyo, Japan

[21] Appl. No.: 09/115,903

[22] Filed: Jul. 15, 1998

Related U.S. Application Data

[62] Division of application No. 08/908,312, Aug. 7, 1997, abandoned, which is a division of application No. 08/527,869, Sep. 14, 1995, abandoned.

[30] Foreign Application Priority Data

Sep. 14, 1994 [JP] Japan .................................. P6-219666

[51] Int. Cl.⁶ ...................................................... B65H 3/52
[52] U.S. Cl. .......................................................... 271/122
[58] Field of Search .................................... 271/121, 122, 271/124, 125, 188, 272–274

[56] References Cited

U.S. PATENT DOCUMENTS

| | | | |
|---|---|---|---|
| 3,545,742 | 12/1970 | Muller | 271/122 X |
| 4,089,378 | 5/1978 | Suzuki | 271/272 X |
| 4,158,456 | 6/1979 | Holland-Letz | 271/122 X |
| 4,496,145 | 1/1985 | Fukui | 271/122 |
| 4,515,358 | 5/1985 | Fukui | 271/122 |
| 4,705,265 | 11/1987 | Hirota et al. | 271/125 X |
| 4,858,905 | 8/1989 | Weigel | 271/125 X |
| 5,016,866 | 5/1991 | Takahashi | 271/122 |
| 5,474,287 | 12/1995 | Takahashi | 271/122 X |
| 5,678,817 | 10/1997 | Saito et al. | 271/122 |

FOREIGN PATENT DOCUMENTS

| | | |
|---|---|---|
| 61548 | 5/1980 | Japan . |
| 282032 | 11/1988 | Japan . |
| 214537 | 8/1989 | Japan . |
| 85630 | 4/1993 | Japan . |

Primary Examiner—Boris Milef
Attorney, Agent, or Firm—Oblon, Spivak, McClelland, Maier & Neustadt, P.C.

[57] ABSTRACT

The present invention relates to a separation mechanism for separating and feeding paper sheet. The respective convex portions and concave portions of the conveying roller and the separating roller are opposed to each other in a state of different-steps so as not to be brought into contact with each other. The conveying roller is rotated in the normal direction which is the same as that of feeding the paper sheet and the separating roller is rotated in the reverse direction to that of feeding the paper sheet. The separation mechanism for the fed paper sheet for separating sheet by sheet a plurality of manuscript document sheets piled on the document sheet tray is formed such that the diameter of the separating roller is made smaller than that of the conveying roller and the frictional coefficient of the separating roller is also made smaller than that of the conveying roller. The conveying roller has gradually increasing pitches P1, P2, and P3 (P1<P2<P3), and the separating roller has gradually increasing pitches P4 and P5 (P4<P5).

30 Claims, 7 Drawing Sheets

SEPARATION MECHANISM FOR SEPARATING AND FEEDING PAPER SHEET

This application is a Division of application Ser. No. 08/908,312, filed on Aug. 7, 1997 now abandoned which is a divisional of application Ser. No. 08/527,869, filed on Sep. 14, 1995, now abandoned.

BACKGROUND OF THE INVENTION

1. Field of the Invention

The present invention relates to a separation mechanism for separating and feeding paper sheet, in particular, a separation mechanism for separating and feeding the paper sheet which is provided in a scanner apparatus, a laser beam printer, a copying machine, etc, and capable of separating plural sheets of paper sheet by sheet and feeding separated individual paper.

2. Description of the Related Arts (Prior Arts)

In the recent years, paper separating/feeding apparatus in the image forming apparatus installed in the copying machine, etc. is provided with a paper separation mechanism for separating the fed paper sheet. This apparatus adopts the method of separating and feeding paper by partially bringing the manuscript document into slidable contact with the respective convex portions of the conveying roller and the separating roller as a paper separating mechanism different from that of separating one sheet from the plural sheets of the manuscript document by bringing the plural manuscript documents, etc. into slidable contact with the overall surface of the conveying roller and the separating roller.

Figure 7A:
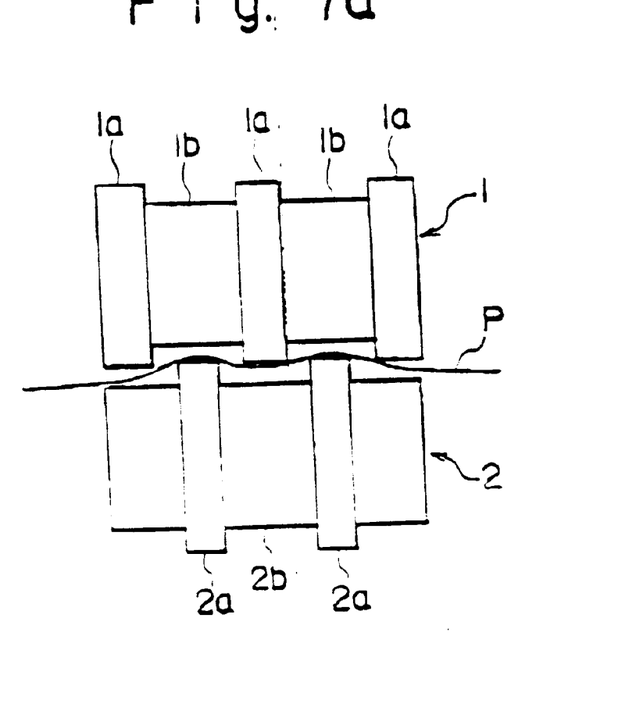
FIG. 7a is a front view showing the construction of the prior-art paper separating mechanism and FIG. 7b is a side view showing the same.
Figure 7B:
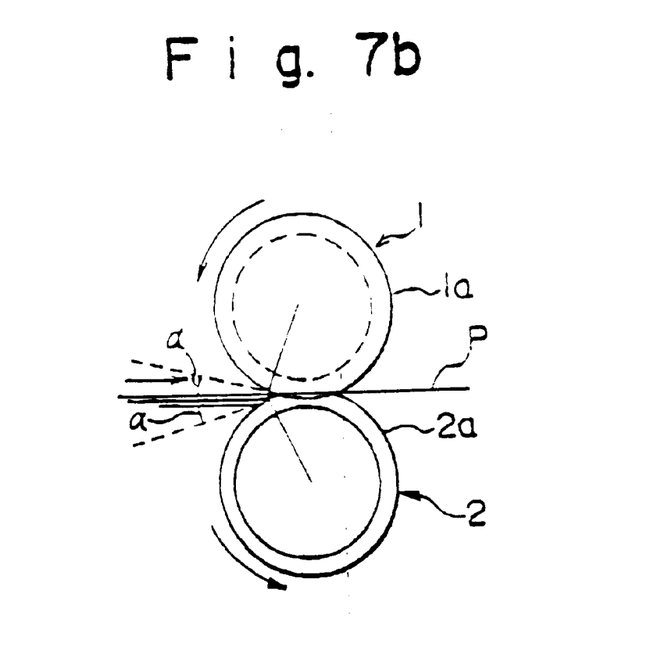

For instance, the published specification of Japanese Laid-open Patent Publication No. 4-89732/1992 describes such a paper separating mechanism as shown in FIGS. 7a and 7b.

In FIGS. 7a and 7b, the reference numeral 1 represents a conveying roller, 2a separating roller, and both of the rollers 1 and 2, respectively, have convex portions 1a and 2a and concave portions 1b and 2b provided between the convex portions 1a and 2a, and further the both pitches of the respective convex portions 1a and 2a are almost equal.

The conveying roller 1 and the separating roller 2 oppose each other in a state of forming uneven steps such that the convex portions 1a, 2a and the concave portions 1b, 2b do not come into contact with each other.

The conveying roller 1 rotates in a positive direction for the paper feeding direction of the manuscript document P, while the separating roller 2 rotates in a negative (inverse) direction for the same. Further, the frictional coefficient of the above-mentioned conveying roller 1 is larger than that of the separating roller 2.

Regarding those rollers; the conveying roller 1 and the separating roller 2, the engagement amount (overlap amount) between the concave portion 1b or 2b and the convex portion 1a or 2a is adjusted by use of the adjusting means not shown in FIGS. 7a and 7b, in accordance with the paper thickness of the manuscript document.

When the above-mentioned amount is adjusted, the adjusting means sets the overlap amount of the manuscript document such that the overlap amount thereof turns out to be large while that of the thick manuscript document turns out to be small. If the adjustment is not performed in such way, in the case of employing the thin manuscript document sheet, the document sheet deforms and as a result the same escapes from the convex portions 1a and 2a of the rollers 1 and 2.

In such a situation, the document sheet having weak waist (easily bent) deforms largely, while the other document sheet having strong waist (rigid) does not deform so much compared with the case of employing the thin manuscript document sheet having weak waist.

In such separating mechanism as mentioned heretofore, when two or more sheets of manuscript document are fed for example, the document sheets advance into the space between the rollers 1 and 2.

However, since the frictional force between the manuscript document and the separating roller 2 rotating in an opposite direction to that of feeding paper is larger than the frictional force between both of the manuscript document sheets, all other document sheets excluding the upper-most side document sheet are pushed back to the separating roller 2. As a result, only the upper-most side document sheet brought into slidable contact with the conveying roller is fed. In such a manner, the document sheet can be prevented from being fed in a state of two or more sheets.

However, in such a conventional sheet feeding apparatus, since the diameters (the diameters of the convex portions 1a and 2a) of the conveying roller 1 and the separating roller 2 are approximately equal to each other, there arose a problem to be solved in the past that double (superposing) conveying of the manuscript document sheets could not be prevented sufficiently.

Namely, in case that the diameters of the rollers 1 and 2 are almost equal to each other, the advancing angles α of two manuscript documents (the angles formed in the sheet feeding direction and the tangent line between the rollers 1 and 2) are made almost equal to each other, and thereby two sheets of the manuscript document advance toward the space between the rollers 1 and 2 at the same time. At this time, since the frictional coefficient of the separating roller 2 is larger than that of the conveying roller 1, two sheets of document are fed in a state of coming into contact with each other without separating the document sheets advancing at the same time toward the space between the rollers 1 and 2 on some occasions.

For this reason, the double conveying of the manuscript document cannot be prevented sufficiently.

Further, since the engaging amount of the rollers 1 and 2 (the distance between the rollers 1 and 2) has to be adjusted at every time by the adjusting means in accordance with the thickness of the manuscript document, the adjustment work for adjusting the engaging amount requires much time and thereby the adjustment work cannot be done efficiently. It is a problem to be solved in the prior-art technology.

Further, since the respective pitches between the convex portions 1a and 2a of the paper feeding (conveying) roller 1 and the paper separating roller 2 are approximately equal to each other, the manuscript document sheet is entirely applied with a uniform contacting force in a direction perpendicular to that of feeding the document sheet by the action of those convex portions 1a and 2a. In consequence, in case that a skewing of the document sheet occurs at the time of feeding, the document sheet is conveyed in a state of skewing by the conveying roller disposed at the downstream side of the paper separating mechanism.

Furthermore, since the convex portions have the uniform pitch, the document sheet is uniformly bent in the direction perpendicular to that of conveying the document sheet. For this reason, the separated document sheet recovers its original state from being in the bent state in the sheet conveying direction toward the center portion, and never-the-less the document sheet's both ends keeps the state of banding as it is on some occasions, and thereby an ear folding, etc. occurs on both ends of the document sheet in the width direction thereof. Those are the problems to be solved.

SUMMARY OF THE INVENTION

The present invention was made in consideration of the matters mentioned heretofore.

It is an object of the present invention to solve the points at issue as mentioned above.

It is another object of the present invention to provide a paper separating mechanism for separating the fed sheets of paper (document) which can prevent the paper sheets from causing the injury thereof such as wear-off by rubbing or scratching and thereby the mechanism can prevent an occurrence of the double conveying of the paper sheets.

It is another object of the present invention to provide a paper separating mechanism for surely separating and feeding the paper sheets capable of preventing the occurrence of the paper sheets injury and the double conveying of the paper sheets.

It is still another object of the present invention to provide a paper separating mechanism capable of automatically changing the respective distances between the convex portion and the concave portion of the conveying roller and the separating roller in accordance with the thickness and the hardness of the manuscript document sheet, and thereby capable of effectively adjusting the distance between the conveying roller and the separating roller in accordance with the various sorts of document sheet.

It is still another object of the present invention to provide a paper separating mechanism capable of easily correcting the skewing of the document sheet and surely preventing the document sheet from the occurrence of ear-folding at the both end portions thereof in the width direction.

It is still another object of the present invention to provide a paper separating mechanism capable of further surely preventing the surface of the sheet brought into slidable contact with the separating roller having the frictional coefficient smaller than that of the conveying roller from causing scratching thereon and losing injured thereby.

BRIEF DESCRIPTION OF THE DRAWINGS

A more complete appreciation of the present and many of the attendant advantages thereof will be readily obtained as the same becomes better understood by reference to the following detailed description when considered in connection with the accompanying drawings, wherein:

FIGS. 2a and 2b show the state of the both conveying and separating rollers, wherein

FIGS. 7a and 7b show the conventional paper separating mechanism, wherein

DETAILED DESCRIPTION OF THE PREFERRED EMBODIMENT

In the first status of the embodiment according to the present invention, in order to solve the above-mentioned subject matters, there are provided a couple of conveying rollers and a couple of separating rollers, respectively, having the convex portions brought into contact with the paper sheet and the concave portions positioned between the above convex portions and not brought into contact therewith. In the above-mentioned first status, the convex portion and the concave portion of the above respective rollers are opposed to each other in a state of forming different steps so as not to bring one into contact with another. The conveying roller is rotated in a positive (normal) direction for the sheet feeding direction, while the separating roller is rotated in a negative (inverse) direction for the same. Such paper sheet feeding and separating mechanism for separating sheet by sheet plural paper sheets piled on the paper sheets piling portion is characterized in that the diameter of the paper separating roller is made smaller than that of the paper conveying roller and the frictional coefficient of the separating roller is also made smaller than that of the conveying roller.

In the second status of the embodiment according to the present invention, in order to solve the above-mentioned subject matter, there is provided changing means for automatically changing the distance between the convex portion and the concave portion of the conveying roller and the separating roller in accordance with the thickness and the hardness of the paper sheet in the first status of the embodiment.

In the third status of the embodiment according to the present invention, in order to solve the above-mentioned subject matter, the conveying roller and the separating roller has pitches between the convex portions and are formed so as to make symmetrical at right and left positions around the center portion in the axis line direction of the conveying roller and the separating roller and so as to make gradually large toward the external position in the axis line direction, in the first or second status of the embodiment. Further, the conveying roller and the separating roller is made opposed to each other such that the center portion of the separating roller's convex portion is situated at the center portion of the conveying roller's concave portion.

In the fourth status of the embodiment according to the present invention, in order to solve the above-mentioned subject matter, the rotational speed of the separating roller is made smaller than that of the conveying roller in either one of the first through third statuses of the embodiment.

ADVANTAGEOUS FUNCTIONAL EFFECTS

In the first status of the embodiment, both of the separating roller and the conveying roller are formed such that the diameter of the former is smaller than the latter. Assuming that the rollers are constructed in such way, the sheet advancing angles differ from each other between the conveying roller and the separating roller.

To state more concretely, the angle $\theta_a$ of the conveying roller's tangent line for the sheet feeding direction turns out to be smaller than the angle $\theta_b$ of the separating roller's tangent line. In consequence, after one sheet among the plural sheets opposing to the conveying roller side is firstly brought into slidable contact with the conveying roller, the tip edge portion of the remaining sheets turns out to be brought into slidable contact with the separating roller.

Therefore, first of all, the sheet at the side of the conveying roller in fed by the conveying roller and thereafter the remaining sheets are pushed back by the separating roller rotating in a direction inverse to that of feeding the paper. Therefore, the paper sheets can be surely separated without double conveying and thereby the efficiency of separating the paper sheets can be improved.

Further, since the frictional coefficient of the separating roller is smaller than that of the conveying roller, after the sheet brought into slidable contact with the separating roller rotating in a direction inverse to that of feeding the paper sheet is separated therefrom, rubbing off the surface of the paper sheet by the separating roller can be suppressed, and thereby the occurrence of paper powder can be also suppressed. Furthermore, when the sheet is printed, the injury on the printed surface of the paper sheet can be protected from being injured.

In the second status of the embodiment, there is provided changing means for automatically changing the respective distances between the convex portion and the concave portion of the conveying roller and the separating roller in accordance with the thickness and the hardness of the paper sheet. Consequently, in the case of employing thin and soft paper sheet, the respective distances between the convex portion and the concave portion of the conveying roller and the separating roller is automatically made small, and further, the respective distances therebetween of the both rollers turn out to be large in the case of employing thick and hard paper sheet. As a result, the distance between the convex portion and the concave portion can be effectively adjusted in accordance with the sort of the paper sheets, and thereby various sorts of sheets can be surely separated and fed.

In the third status of the embodiment, the pitches between the convex portions of the conveying roller and the separating roller are formed so as to be disposed symmetrically around the center portion of the axis lines directions of the both rollers, and so as to make the above-mentioned pitches gradually large toward the outside in the axis line direction. Further, the conveying roller and the separating roller are opposed to each other such that the center portion of the separating roller's convex portion is situated at the center portion of the conveying roller's concave portion.

Consequently, when the paper sheet is separated from the others by the respective concave portions of the conveying roller and the separating roller, the center portion of the paper sheet is bent most largely, and the extent of being bent becomes moderate in the area toward both end portions in the width direction of the paper sheet. For this reason, when the paper sheet passes through the conveying roller and the separating roller, the extent of the sheet bending is made moderate.

Furthermore, when the paper sheet is delivered to the conveying roller at the downstream side in the sheet conveying direction, there arises no ear-folding at the both end portions in the width direction of the paper sheet.

Furthermore, since the center portion of the paper sheet is bent most largely, the largest conveying force is created at the center portion of the paper sheet, and it follows that, in case that there occurs a skew on the paper sheet, a force for correcting the skew is created around the center portion of the paper sheet when the paper sheet is received by the conveying roller at the downstream side in the sheet conveying direction. As a result, the skew thus created is corrected and thereby the paper feeding efficiency can be improved.

In the fourth status of the embodiment, since the rotational speed of the separating roller is smaller than that of the conveying roller, rubbing of the paper sheet brought into slidable contact with the separating roller having a frictional coefficient lower than that of the conveying roller can be prevented from occurring thereon. Further, the paper sheet can be protected further surely from being injured.

EMBODIMENT

The present invention is described hereinafter on the basis of the embodiment thereof, referring to FIGS. 1 through 6. FIGS. 1–6 are the figures relating to either one of the first to fourth statuses or the embodiment regarding the separating mechanism for separating the paper sheets to be fed according to the present invention.

Such a mechanism is an example of applying the present invention to the scanner device.

Figure 1:
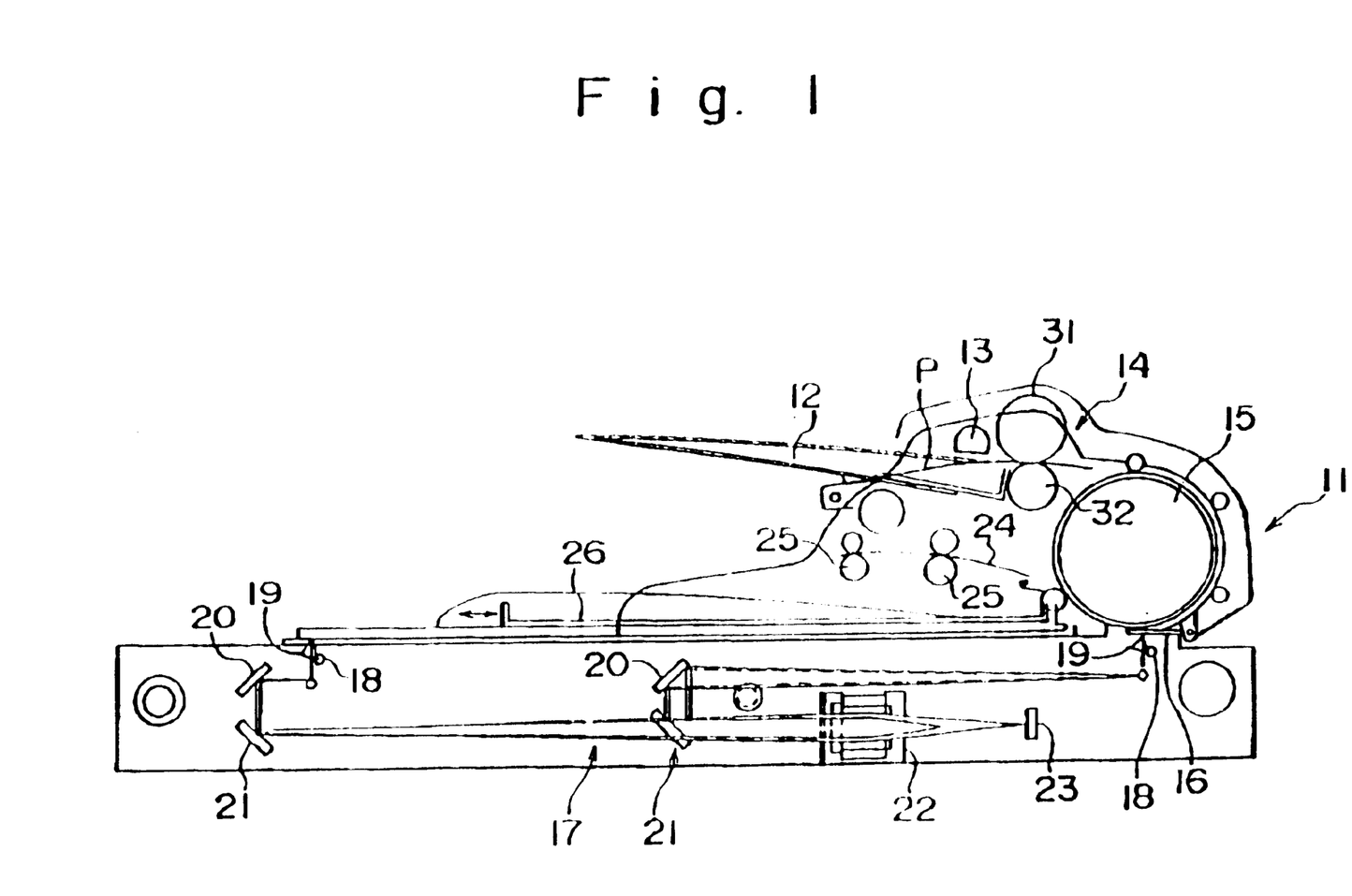
FIG. 1 is a side-elevational cross-sectional view for illustrating the construction of a scanner device provided with a paper (feeding and) separating mechanism relating to either one of the first to fourth statuses of the embodiments according to the present invention.
Figure 2A:
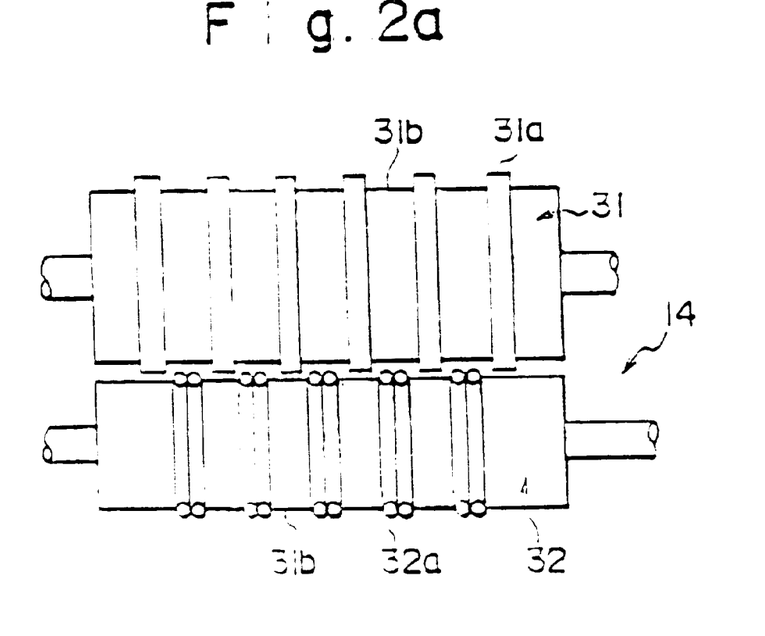
FIG. 2a is a front view of a conveying roller and a separating roller respectively for conveying and separating paper sheets and FIG. 2b is a side view seen from the side surface of the conveying and separating rollers in a state of separating one from another.
Figure 2B:
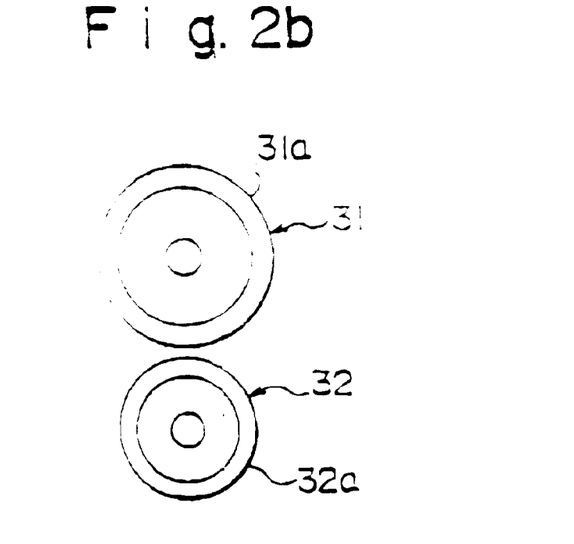

First of all, the construction thereof is explained below. In FIGS. 1 and 2, the reference numeral 11 represents a scanner device. A manuscript document tray (sheets piling-up portion) 12 capable of piling up thereon plural document sheets P is disposed on the upper portion of the scanner device 11. The document sheets P piled up on the manuscript document tray 12 are picked up by the picking-up roller 13, and thereafter, the picking-up sheet is fed toward a separating mechanism 14.

As mentioned later, the separating mechanism 14 is the one for separating only one sheet from the plural document sheets P and feeding the separated sheet. The document sheet P thus separated by the separating mechanism 14 is conveyed by a turning-over drum 15 to a slit glass 16, and thereafter, the conveyed sheet is exposed by a well-known optical unit 17. The optical unit 17 is constructed with a light source 18, reflection mirrors 19, 20, and 21, a focusing element 22, and a reading-out element 23 such as CCD, etc.

When the automatically fed manuscript document sheet P is read out through the slit glass 16, the surface of the document sheet P is read out through the slit glass in a state of stopping the movement thereof just below the slit glass 16.

The exposed document sheet P is conveyed toward a paper sheet discharging path (route) 24, by means of the turning-over drum 15, and the conveyed sheet P is discharged into the paper discharging portion 26 forming the upper surface of the scanner device 11 by plural paper discharging rollers 25 arranged on the paper sheet discharging path 24.

Figure 3:
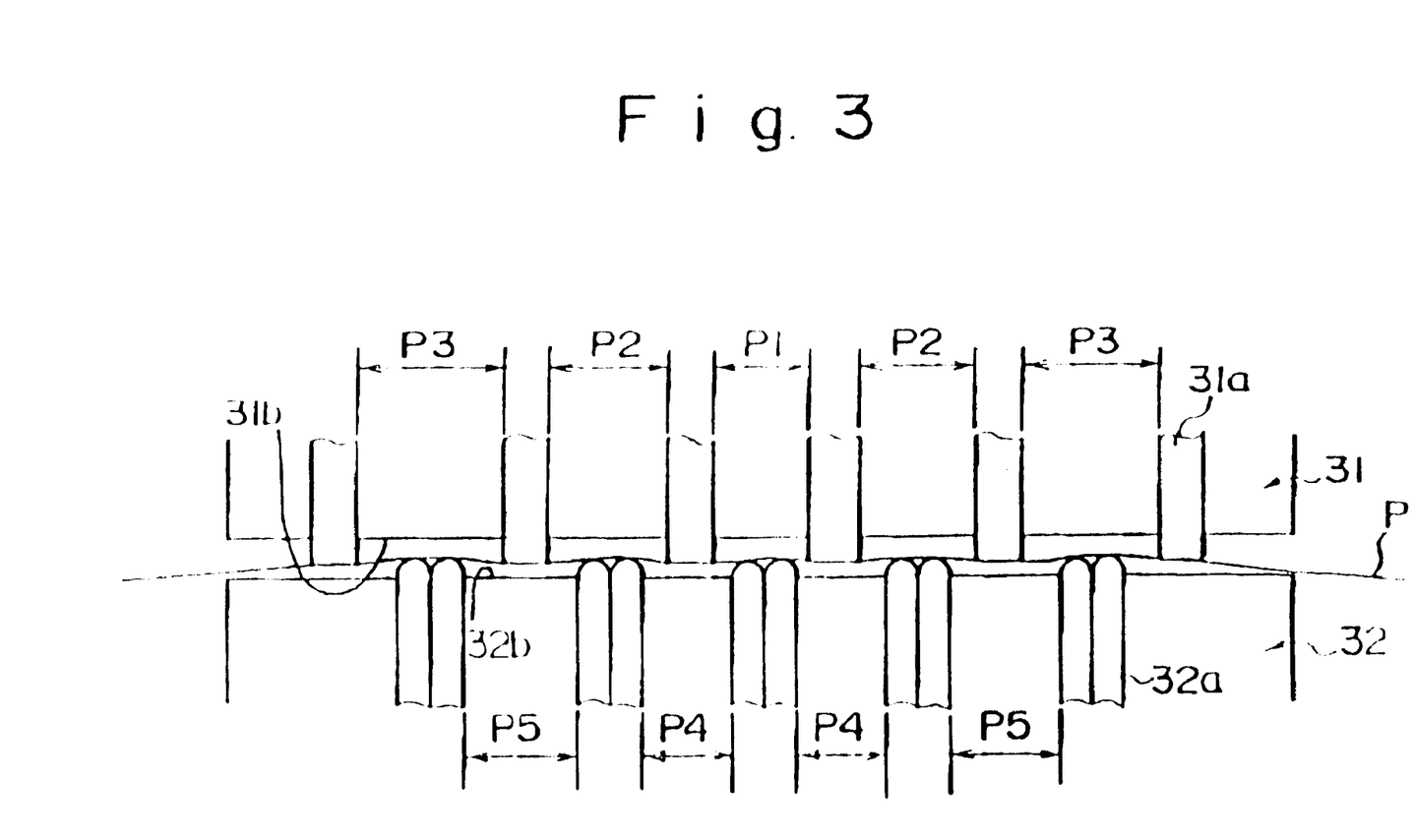
FIG. 3 is a detailed view showing respective pitches between the convex portions of the conveying roller and the separating roller.

On the other hand, as illustrated in detail in FIGS. 2a, 2b and 3, the separating mechanism 14 comprises a conveying roller 31 and a separating roller 32.

A plurality of convex portions 31a and 32a capable of coming into contact with the manuscript document sheet P are respectively formed on the conveying roller 31 and the separating roller 32. The conveying roller 31 and the separating roller 32 are opposed to each other mutually in a state of forming different-level steps such that the respective convex portions 31a and 32a of the rollers 31 and 32 do not come into contact with respective concave portions 31b and 32b of the rollers 31 and 32 respectively positioned between the respective convex portions 31a and 32a of the rollers 31 and 32.

Furthermore, the diameter of the separating roller 32 is made smaller than that of the conveying roller 31, and the frictional coefficient of the separating roller 32 is also made smaller than that of the conveying roller 31.

Further, as shown in FIG. 3, the conveying roller 31 and the separating roller 32 are formed such that the pitches P1 through P5 between the respective convex portions 31a and 32a of the both rollers 31 and 32 are symmetrical to the left and right around the center portions in the axis line directions of the both rollers 31 and 32 and those pitches become gradually large toward the external position in the axis line directions. Namely, the above status satisfies the following inequalities;

P1<P2<P3, and

P4<P5.

In such conditions as mentioned above, the conveying roller 31 and the separating roller 32 are opposed to each other such that the center portions of the convex portions 32a of the separating roller 32 are located at the center portions of the concave portion of the conveying rollers 31, and vice versa (the center positions of the convex portions 31a of the conveying roller 31 are located at the center positions of the concave portions 32b of the separating roller 32).

Figure 4:
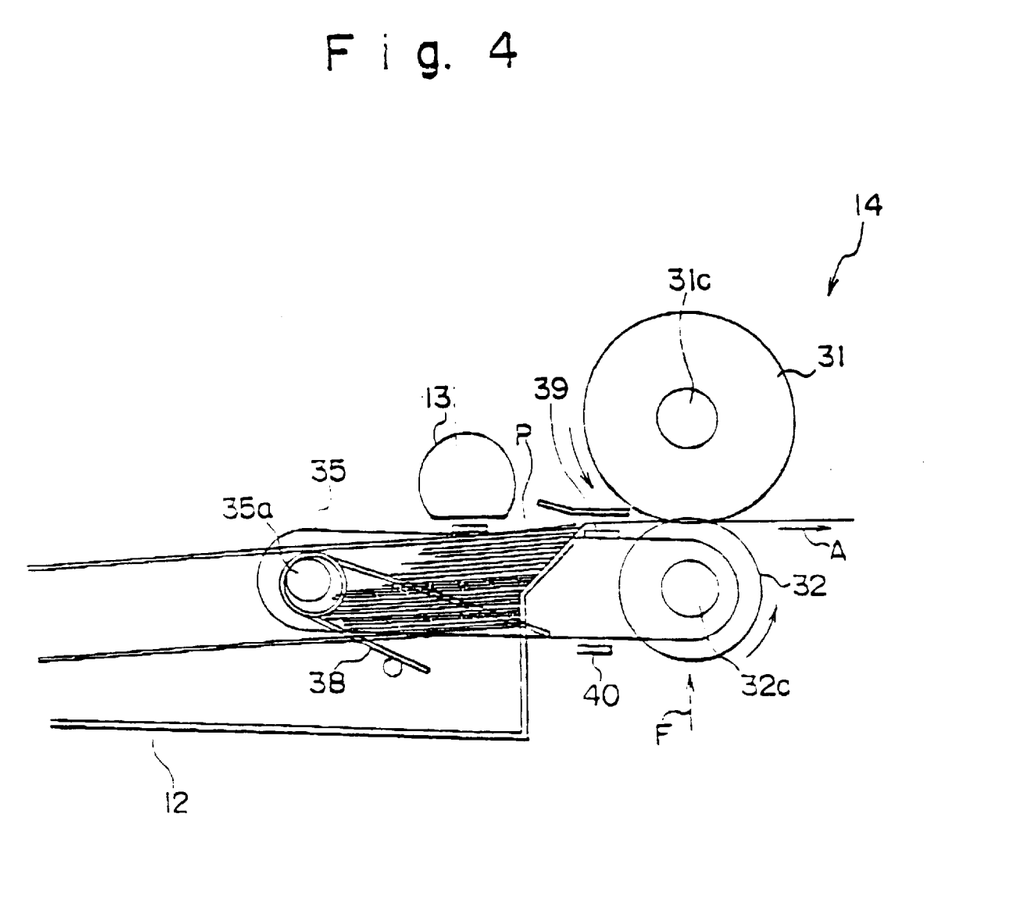
FIG. 4 is a cross-sectional side view of the paper separating mechanism.
Figure 5:
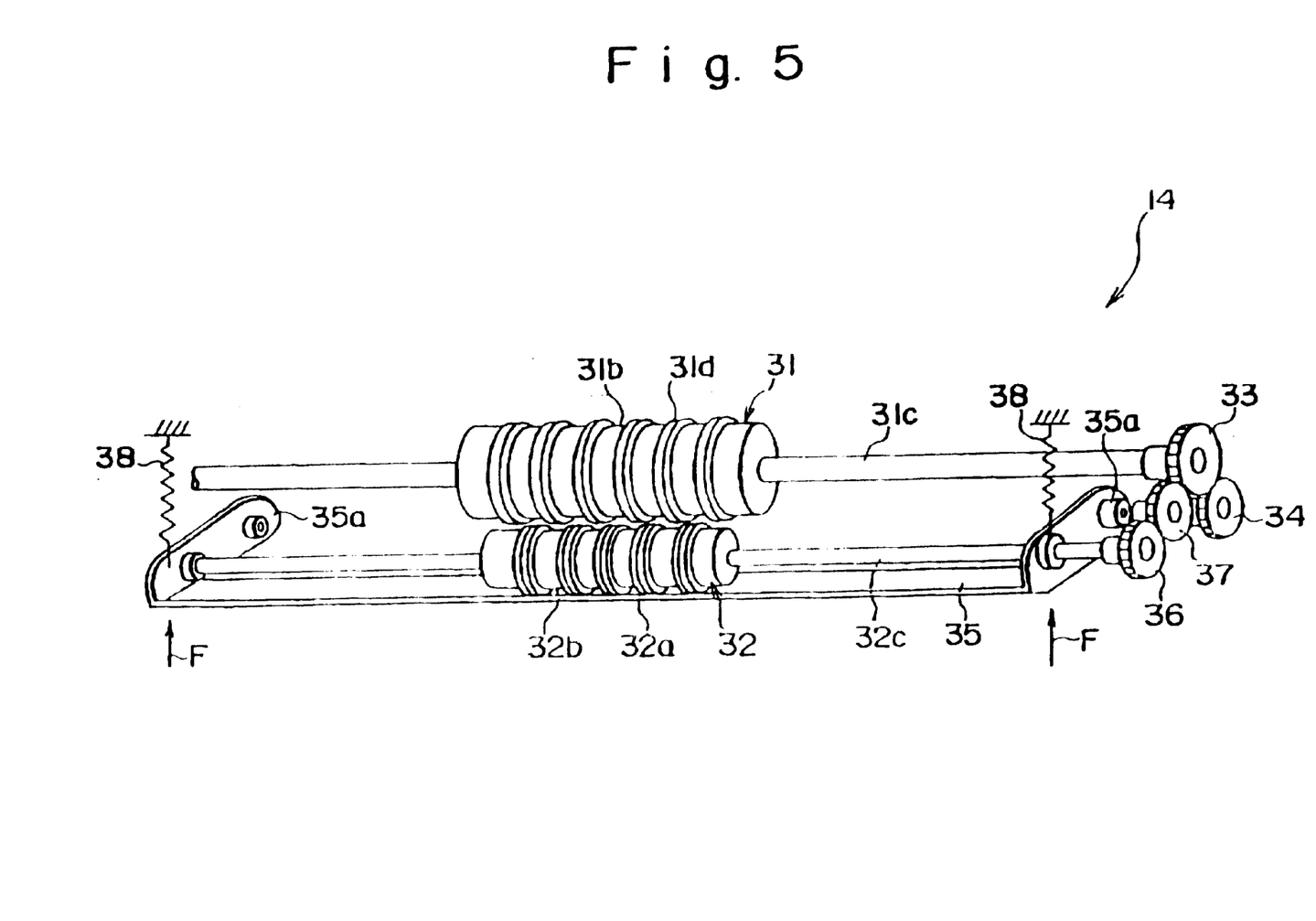
FIG. 5 is a perspective view of the paper separating mechanism.

Furthermore, as shown in FIGS. 4 and 5, a roller axis 31c of the conveying roller 31 is rotatably supported by the separating unit not shown in FIGS. 4 and 5, and a conveying roller gear 33 is mounted on one end portion of the roller axis 31 c of the conveying roller 31. A gear 34 of a motor (not shown in FIGS. 4 and 5) installed in the scanner device 11 is engaged with the conveying roller gear 33. In such construction, a driving force of the motor can be transmitted to the conveying roller 31 through the motor gear 34.

Furthermore, a roller axis 32c of the separating roller 32 is rotatably supported by a supporting member 35, and a rocking portion 35a of the supporting member 35 is mounted on the separating unit so as to rock therearound, and a separating roller gear 36 is mounted on one end portion of the roller axis 32c of the separating roller 32. The separating roller gear 36 is connected to the conveying roller gear 33 through an idler gear 37. The driving force from the conveying roller gear 33 is transmitted through the idler gear 37. For this reason, in the case of setting the rotational direction of the conveying roller 31 to the same direction as that of conveying the manuscript document sheet P, the separating roller 32 can be rotated in the reverse direction to that of conveying the sheet P.

Furthermore, the separating unit is connected to the supporting member 35 through a spring 38. Changing means is constructed with the spring 38 and the supporting member 35. The separating roller 32 is energized through the supporting member 35 so as to put the separating roller 32 at the position adjacent to the conveying roller 31. Hereupon, the energizing force F of the spring 38 is set to almost 50 g–300 g. When the document sheet advances toward the space between the conveying roller 31 and the separating roller 32, the respective distances between the convex portions 31a and 32a of the conveying roller 31 and the separating roller 32 and the respective distances between the concave portions 31b and 32b of the both rollers 31 and 32 can be respectively adjusted automatically in accordance with the thickness and the hardness of the manuscript document sheet P by expanding the sheet P in a direction opposite to that of the applied energizing force F.

Furthermore, a couple of upper and lower stoppers 39 and 40 are respectively mounted on the both end portions in the width direction of the supporting member 35. Those stoppers 39 and 40 are engaged with an engaging member not shown in FIGS. 4 and 5.

The movement (amount) of the document sheet P in the upward and downward directions is restricted so as to be within the predetermined range. Moreover, when the upper-side stopper 39 is engaged with the engaging member, the distance between the conveying roller 31 and the separating roller 32 is set such that a thin document sheet P can advance therebetween.

Further, although the spring 38 is disclosed diagrammatically in FIG. 5, the spring 38 is wound around the rocking axis 35a in practice as shown in FIG. 4, and thereby the supporting member 35 is energized in the pressurizing direction shown in FIG. 4.

Furthermore, regarding the above-mentioned respective gears 33, 36, and 37, the gear ratio is set so as to reduce the revolutionary force of the motor such that the revolutionary force of the separating roller 32 becomes low compared with the revolutionary force of the conveying roller 31 at the time of transmitting the revolutionary force of the motor to the revolutionary force is transmitted to the separating roller 32.

Next, the functional operation of the separating mechanism for separating the sheet to be fed is explained hereinafter.

Figure 6:
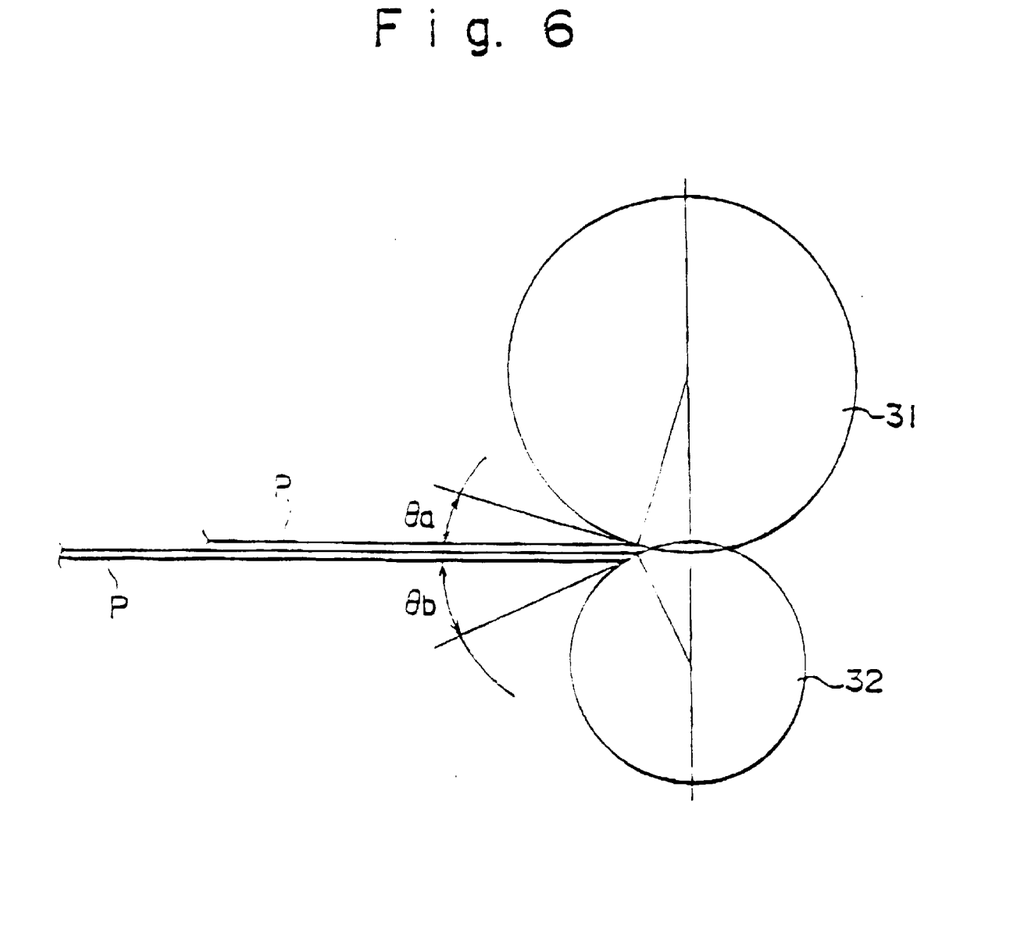
FIG. 6 is a side view showing the direction of conveying the paper sheets by the conveying roller and the separating roller and the angle of the tangent line of the paper sheet.

Assume that, for instance, two sheets of the manuscript document P are piled on the manuscript document tray 12. The two document sheets P piled on the tray 12 are fed toward the space between the conveying roller 31 and the separating roller 32 by the pick-up roller 13. At this time, since the diameter of the separating roller 32 is smaller than that of the conveying roller, the angle $\theta_a$ of the conveying roller's tangent line for the paper feeding direction for feeding the manuscript document sheet P turns out to be smaller than the angle $\theta_b$ of the separating roller's tangent line, and the upper-side document sheet P among two sheets of document P opposing to the side of the conveying roller 31 comes into slidable contact with the conveying roller 31, and thereafter, the tip end portion of the document sheet coming into contact with the lower side of the document sheet P turns out to be brought into slidable contact with the separating roller 32.

For this reason, firstly, after the upper-side document sheet P is fed by the conveying roller 31, the lower-side document sheet P is pushed back by the separating roller 32 rotating in a direction inverse to that of feeding the paper. Consequently, the upper-side document sheet P is separated from the lower-side document sheet P and fed therefrom immediately before the upper-side sheet P advances toward the convex portions 31a and 32a.

Further, after separating the manuscript document P, it is held so as to be clipped between the convex portions 31a and 32a as shown in FIG. 3.

Thereafter, the document P is separated by the conveying roller 31 in a state of being bent. At this time, since the frictional coefficient of the separating roller 32 is smaller than that of the conveying roller 31, and thereby the rotational speed of the separating roller 32 becomes low. Consequently, since the separated document sheet P receives only comparatively small resistance from the separating roller 32, the sheet P can be separated smoothly.

Further, since the pitches P1 through P5 of the convex portions 3 a and 32a become large in an outer direction from the center portions of the conveying roller 31 and the separating roller 32, the document sheet P is bent most largely at the center portion, that is, the convex portion 31a having the pitch P1, and the sheet P becomes gradually bent toward the outer direction from the convex portion 31a and it is separated therefrom.

On the other hand, since the stopper 39 of the supporting member 35 is always engaged with the engaging member, the upward movement of the supporting member 35 is restricted, and the convex portions 31a and 32a are adjacently situated to the concave portions 31b and 32b, the distance between the conveying roller 31 and the separating roller 32 is kept to the above-mentioned distance at the time of separating the thin document sheet.

Further, in the case of employing thick paper or a hard document sheet P, the supporting member 35 moves downward at the rocking portion 35a as a rocking point against the energizing force F of the spring 38 at the time of separating the document sheet P in accordance with the thickness or the hardness of the document sheet P.

Furthermore, on the condition that the distance between the axis cores of the separating roller gear 36 and the idler gear 37 is made constant, the separating roller gear 36 moves along the outer circumferential portion of the idler gear 37. Consequently, the distances between the convex portions 31a and 32a and between the concave portions 31b and 32b are automatically separated from each other. For this reason, it is possible to obtain optimum engaging amounts between the convex portions 31a and 32a and the concave portions 31b and 32b in accordance with the thickness and the hardness of the document sheet P.

The document sheet P thus separated is conveyed by the turning-over drum 15 toward the slit glass 16. The conveyed sheet P is exposed on the slit glass by the optical unit 17, and thereafter, it is conveyed to the paper discharging portion 26 by the paper discharging roller 25. The separation of the document sheet P is successively performed by repeating such operations.

In such a manner according to the embodiment of the present invention, since the diameter of the separating roller 32 is smaller than that of the conveying roller 31, it is possible to make the angle $\theta_a$ formed between the tangent line of the conveying roller 31 and the paper feeding direction for the document sheet P smaller than the angle $\theta_b$ formed between the tangent line of the separating roller 32 and the paper feeding direction for the document sheet P. For this reason, the document sheet P opposed to the side of the conveying roller 31 is firstly brought into slidable contact with the conveying roller 32, and thereafter the tip end portion of the lower-side document sheet P can be brought into slidable contact with the separating roller 32. After the document sheet P is firstly fed by the conveying roller 31, the other remaining document sheet P can be pushed back by the separating roller 32 rotating in a direction opposite to that of feeding the paper sheet. As a result, the document sheet P can be surely separated and prevented from double feeding thereof, and thereby the efficiency of separating the document sheet P can be improved.

Further, since the frictional coefficient of the separating roller 32 is made smaller than that of the conveying roller 31, the surface of the document sheet P brought into slidable contact with the separating roller 32 rotating in the opposite direction to that of feeding the paper sheet after paper sheet separation can be prevented from being rubbed or scratched by the separating roller, and thereby the occurrence of paper powder can be suppressed and further the printed portion can be prevented from being injured.

Furthermore, since the respective distances between the convex portions 31a and 32a of the conveying roller 31 and the separating roller 32 and between the concave portions 31b and 32b of the both rollers 31 and 32 is automatically changed in accordance with the thickness and the hardness of the document sheet P, the distances between the convex portions 31a and 32a and between the concave portions 31b and 32b can be effectively adjusted in accordance with the sort of the document sheet P, and further it is possible to feed surely the respective document sheets P such as tracing paper, drawing paper, etc. Needless to mention, same functional effects can be obtained as a matter of course, even in case that the various sorts of manuscript document exist mixedly.

Furthermore, since the paper separating mechanism is formed such that the pitches P1–P5 between the respective convex portions 31a and 32a of the conveying roller 31 and the separating roller 32 are symmetrical to the left and right around the center portions in the axis line direction of the both rollers 21 and 32 and become gradually large toward the external direction of the axis line, and the conveying roller 31 and the separating roller 32 are opposed to each other so as to put the center portion of the convex portions 32a of the separating roller 32 at the center portion of the concave portions 31b of the conveying roller 31, it follows that the center portion of the document sheet P is bent most largely at the time of separating the document sheet P and the extent of being bent becomes moderate toward the both end portions in the width direction of the document sheet P.

For this reason, the extent of bending the document sheet P can be made moderate when the document sheet P passes through the conveying roller 31 and the separating roller 32, and thereby the document sheet P can be prevented from the occurrence of the ear-folding at the both end portions in the width direction thereof when the document sheet P is received by the turning-over drum 15 disposed at the downstream side in the direction of conveying the document sheet P.

Furthermore, since the center portion of the document sheet P can be bent most largely, it is possible to create the largest conveying force on the center portion of the document sheet P.

Further, in case that a skew occurs on the document sheet P, it is possible to create a force for correcting the skew around the center portion of the document sheet P when the document sheet P is received by the turning-over drum 15. As a result, the skew is corrected and thereby the paper feeding efficiency can be improved.

Furthermore, since the rotational speed of the separating roller 32 is made lower than that of the conveying roller 31, the document sheet P brought into slidable contact with the separating roller 32 having the frictional coefficient smaller than that of the conveying roller 31 can be further surely prevented from being rubbed or injured.

Moreover, in the embodiment of the present invention, the separation mechanism for the paper sheet to be fed is applied to the scanner device. However, it is not limited thereto. Such a separation mechanism can be applied to a copying machine, a laser beam printer, or a rotary camera for a microfilm. As for the sheet to be fed, not only the document sheet but the recording paper sheet, the OHP film, or the like can be employed.

ADVANTAGEOUS FUNCTIONAL EFFECT OF THE INVENTION

According to the first status of the embodiment, since the diameter of the separating roller is made smaller than that of the conveying roller, the angle $\theta_a$ formed between the paper sheet feeding direction and the tangent line of the conveying roller can be made smaller than the other angle $\theta_b$ formed between the paper sheet feeding direction and the tangent line of the separating roller.

For this reason, the paper sheet opposed to the conveying roller side is firstly brought into slidable contact with the conveying roller and thereafter the tip end portion of the other remaining sheets can be brought into slidable contact with the separating roller.

Thereby, after the paper sheet is fed by the conveying roller, the other remaining sheets can be pushed back by the separating roller rotating in the opposite direction to that of feeding the paper sheets. As a result, the paper sheets can be separated surely and prevented from the double conveying thereof, and further the efficiency of the paper separation can be improved.

Furthermore, since the frictional coefficient of the separating roller is made smaller than that of the conveying roller, the surface of the paper sheets brought into slidable contact with the separating roller rotating in the opposite direction to that of feeding the paper sheets after separating one paper sheet from the others can be prevented from being rubbed or scratched by the separating roller, and thereby the occurrence of paper powder can be suppressed. Furthermore, in the case of the manuscript document sheet printed with characters, etc., the printed portion can be prevented from being injured.

According to the second status of the embodiment, the respective distances between the convex portions of the conveying roller and the separating roller and between the concave portions of the both rollers can be effectively adjusted in accordance with the sorts of the paper sheet. Furthermore, it is possible to separate and feed surely the various sorts of paper sheet such as tracing paper, drawing paper, etc. which can be surely separated and fed.

Needless to mention, it is possible to obtain the same advantageous functional effect even in the case of employing the mixture of various sorts of paper sheets.

According to the third status of the embodiment, the center portion of the paper sheet can be bent most largely at the time of separating the paper sheet, and then the extent of bending the paper sheet can be made moderate toward the both end portions in the width direction of the paper sheet. For this reason, the extent of bending the paper sheet can be made moderate when the paper sheet passes through the conveying roller and the separating roller. Furthermore, the occurrence of ear-foldings at the both end portions in the width direction of the paper sheet when the paper sheet is received by the conveying roller disposed at the downstream side in the sheet conveying direction can be prevented.

Furthermore, since the center portion of the paper sheet can be bent most largely, the largest conveying force can be generated at the center portion of the paper sheet. In case that a skew occurs on the surface of the paper sheet, when the paper sheet is received by the conveying roller, a force for correcting (eliminating) the skew around the center portion of the paper sheet. As a result, such skew can be eliminated and thereby the efficiency of paper feeding can be improved.

According to a fourth status of the embodiment, the paper sheet brought into slidable contact with the separating roller having lower frictional coefficient than that of the conveying roller can be further surely prevented from occurrence of rubbing or scratching on the paper sheet or being injured on the surface thereof.

What is claimed as new and desired to be secured by Letters Patent of the United States is:

1. A separation mechanism for separating and feeding a paper sheet comprising:

at least one conveying roller having convex portions and concave portions; and at least one separating roller having convex portions and concave portions, said convex portions of said conveying roller and said convex portions of said separating roller brought into contact with said paper sheet, said concave portions of said conveying roller and said concave portions of said separating roller situated at positions between said convex portions and not brought into contact with said paper sheet, and said conveying roller and said separating roller are opposed to each other in a state of being stepped so as not to be brought into contact therewith, and wherein said conveying roller and said separating roller are formed such that pitches between said convex portions are symmetrical on left and right sides of each of said conveying roller and said separating roller as defined along a rotational axis of each of said conveying roller and said separating roller, and the pitches become gradually large toward opposite external portions of each of said conveying roller and said separating roller, and wherein said conveying roller and said separating roller are opposed to each other such that the convex portions of one of said separating roller or said conveying roller is situated at center portions of the concave portions of the other of said separating roller and said conveying roller.

2. A separation mechanism for separating and feeding a paper sheet as defined in claim 1, wherein said conveying roller is rotated in a normal direction which is the same as that of a direction of sheet feeding, and said separating roller is rotated in a reverse direction to that of the direction of sheet feeding for separating sheet by sheet a plurality of said paper sheets piled on a paper sheet piling portion.

3. A separation mechanism for separating and feeding a paper sheet as defined in claim 2, wherein two document sheets piled on a tray are fed toward a space between said conveying roller and said separating roller by a pick-up roller, such that an angle $\theta a$ between a tangent line of the conveying roller and an axis defined by the paper feeding direction is smaller than an angle $\theta b$ between a tangent line of the separating roller and the axis defined by the paper feeding direction; and an upper document sheet of said two sheets of documents which opposes a side of said conveying roller comes into slidable contact with said conveying roller, and thereafter, a tip end portion of the other document sheet of said two sheets which contacts a lower side of said upper side document sheet is brought into slidable contact with said separating roller.

4. A separation mechanism for separating and feeding a paper sheet as defined in claim 2, wherein two document sheets piled on a tray are fed toward a space between said conveying roller and said separating roller by a pick-up roller, wherein, a diameter of said separating roller is smaller than a diameter of said conveying roller, such that an angle $\theta a$ between a tangent line of the conveying roller and an axis defined by the paper feeding direction is smaller than an angle $\theta b$ between a tangent line of the separating roller and the axis defined by the paper feeding direction, and wherein an upper document sheet of said two sheets of documents which opposes a side of said conveying roller comes into slidable contact with said conveying roller, and thereafter, a tip end portion of the other document sheet of said two sheets which contacts a lower side of said upper side document sheet is brought into slidable contact with said separating roller.

5. A separation mechanism for separating and feeding a paper sheet as defined in claim 1, wherein a diameter of said separating roller is smaller than a diameter of said conveying roller, and a frictional coefficient of said separating roller is smaller than a frictional coefficient of said conveying roller.

6. A separation mechanism for separating and feeding a paper sheet as defined in claim 5, wherein a rotational speed of said separating roller is lower than a rotational speed of said conveying roller.

7. A separation mechanism for separating and feeding a paper sheet as defined in claim 1, wherein said conveying roller is rotated in a normal direction which is the same as a direction of sheet feeding and said separating roller is rotated in a reverse direction to that of the direction of sheet feeding for separating sheet by sheet a plurality of said paper sheets piled on a paper sheet piling portion, and wherein a diameter of said separating roller is made smaller than a diameter of said conveying roller, and a frictional coefficient of said separating roller is also made smaller than a frictional coefficient of said conveying roller.

8. A separation mechanism for separating and feeding a paper sheet as defined in claim 7, wherein said separation mechanism further comprises changing means capable of automatically changing respective distances between said convex portions of said conveying roller and said convex portions of said separating roller and between said concave portions of said conveying roller and said concave portions of said separating roller in accordance with a type of said paper sheet.

9. A separation mechanism for separating and feeding a paper sheet as defined in claim 1, wherein said separation mechanism further comprises changing means capable of automatically changing respective distances between said convex portions of said conveying roller and said convex portions of said separating roller and between said concave portions of said conveying roller and said concave portions of said separating roller in accordance with a type of said paper sheet.

10. A separation mechanism for separating and feeding a paper sheet as defined in claim 9, wherein said changing means includes a conveying roller gear attached to an axis of the conveying roller, an idler gear rotatable about its own axis, the idler gear operably connected to the conveying roller gear, a separating roller gear attached to an axis of the separating roller, the separating roller gear operably connected to the idler gear, and spring means for urging the separating roller toward the conveying roller.

11. A separation mechanism for separating and feeding a paper sheet as defined in claim 10, wherein said changing means further includes a supporting member having a rotational axis forming a rocking portion, the idler gear axis is colinear with the supporting member rotational axis, and the separating roller is rotatably connected to the supporting member.

12. A separation mechanism for separating and feeding a paper sheet as defined in claim 11, wherein said spring means of said changing means is a helical torsion spring.

13. A separation mechanism for separating and feeding a paper sheet as defined in claim 12, wherein said changing means further includes a gear of a motor operably connected to the conveying roller gear.

14. A separation mechanism for separating and feeding a paper sheet as defined in claim 1, wherein a rotational speed of said separating roller is lower than a rotational speed of said conveying roller.

15. A separation mechanism for separating and feeding a paper sheet comprising:

at least one conveying roller having convex portions and concave portions; and at least one separating roller having convex portions and concave portions, said convex portions of said conveying roller and said convex portions of said separating roller brought into contact with said paper sheet, said concave portions of said conveying roller and said concave portions of said separating roller situated at positions between said convex portions and not brought into contact with said paper sheet, and said conveying roller and said separating roller are opposed to each other in a state of being stepped so as not to be brought into contact therewith, and wherein said separating roller includes pitches P4 and P5 between respective convex portions and said conveying roller includes pitches P1, P2, and P3 between respective convex portions, the pitches of both said rollers are symmetrical to the left and right around center portions in axis line directions of both said rollers, and the pitches become gradually large toward an external position in axis line directions, so as to satisfy the following inequalities:

$$P1<P2<P3, \text{ and } P4<P5,$$

and wherein, said conveying roller and said separating roller are opposed to each other such that center portions of convex portions of said separating roller are located at center portions of concave portions of said conveying rollers, and center positions of convex portions of said conveying roller are located at center positions of concave portions of said separating roller.

16. A separation mechanism for separating and feeding a paper sheet as defined in claim 15, wherein said conveying roller is rotated in a normal direction which is the same as that of a direction of sheet feeding, and said separating roller is rotated in a reverse direction to that of the direction of sheet feeding for separating sheet by sheet a plurality of said paper sheets piled on a paper sheet piling portion.

17. A separation mechanism for separating and feeding a paper sheet as defined in claim 16, wherein two document sheets piled on a tray are fed toward a space between said conveying roller and said separating roller by a pick-up roller, such that an angle θa between a tangent line of the conveying roller and an axis defined by the paper feeding direction is smaller than an angle θb between a tangent line of the separating roller and the axis defined by the paper feeding direction; and an upper document sheet of said two sheets of documents which opposes a side of said conveying roller comes into slidable contact with said conveying roller, and thereafter, a tip end portion of the other document sheet of said two sheets which contacts a lower side of said upper side document sheet is brought into slidable contact with said separating roller.

18. A separation mechanism for separating and feeding a paper sheet as defined in claim 16, wherein two document sheets piled on a tray are fed toward a space between said conveying roller and said separating roller by a pick-up roller, wherein, a diameter of said separating roller is smaller than a diameter of said conveying roller, such that an angle θa between a tangent line of the conveying roller and an axis defined by the paper feeding direction is smaller than an angle θb between a tangent line of the separating roller and the axis defined by the paper feeding direction, and wherein an upper document sheet of said two sheets of documents which opposes a side of said conveying roller comes into slidable contact with said conveying roller, and thereafter, a tip end portion of the other document sheet of said two sheets which contacts a lower side of said upper side document sheet is brought into slidable contact with said separating roller.

19. A separation mechanism for separating and feeding a paper sheet as defined in claim 15, wherein a diameter of said separating roller is smaller than a diameter of said conveying roller, and a frictional coefficient of said separating roller is smaller than a frictional coefficient of said conveying roller.

20. A separation mechanism for separating and feeding a paper sheet as defined in claim 19, wherein a rotational speed of said separating roller is lower than a rotational speed of said conveying roller.

21. A separation mechanism for separating and feeding a paper sheet as defined in claim 15, wherein said conveying roller is rotated in a normal direction which is the same as a direction of sheet feeding and said separating roller is rotated in a reverse direction to that of the direction of sheet feeding for separating sheet by sheet a plurality of said paper sheets piled on a paper sheet piling portion, and wherein a diameter of said separating roller is made smaller than a diameter of said conveying roller, and a frictional coefficient of said separating roller is also made smaller than a frictional coefficient of said conveying roller.

22. A separation mechanism for separating and feeding a paper sheet as defined in claim 21, wherein said separation mechanism further comprises changing means capable of automatically changing respective distances between said convex portions of said conveying roller and said convex portions of said separating roller and between said concave portions of said conveying roller and said concave portions of said separating roller in accordance with a type of said paper sheet.

23. A separation mechanism for separating and feeding a paper sheet as defined in claim 15, wherein a rotational speed of said separating roller is lower than a rotational speed of said conveying roller.

24. A separation mechanism for separating and feeding a paper sheet as defined in claim 15, wherein said separation mechanism further comprises changing means capable of automatically changing respective distances between said convex portions of said conveying roller and said convex portions of said separating roller and between said concave portions of said conveying roller and said concave portions of said separating roller in accordance with a type of said paper sheet.

25. A separation mechanism for separating and feeding a paper sheet as defined in claim 24, wherein said changing means includes a conveying roller gear attached to an axis of the conveying roller, an idler gear rotatable about its own axis, the idler gear operably connected to the conveying roller gear, a separating roller gear attached to an axis of the separating roller, the separating roller gear operably connected to the idler gear, and spring means for urging the separating roller toward the conveying roller.

26. A separation mechanism for separating and feeding a paper sheet as defined in claim 25, wherein said changing means further includes a supporting member having a rotational axis forming a rocking portion, the idler gear axis is colinear with the supporting member rotational axis, and the separating roller is rotatably connected to the supporting member.

27. A separation mechanism for separating and feeding a paper sheet as defined in claim 26, wherein said spring means of said changing means is a helical torsion spring.

28. A separation mechanism for separating and feeding a paper sheet as defined in claim 27, wherein said changing means further includes a gear of a motor operably connected to the conveying roller gear.

29. A method of separating and feeding paper sheets comprising the steps of:

providing at least one conveying roller and at least one separating roller respectively having convex portions brought into contact with said paper sheets and concave portions situated at the positions between said convex portions and not brought into contact with said paper sheets;

opposing said conveying roller and said separating roller to each other in a state of being stepped so as not to be brought into contact therewith;

rotating said conveying roller in a normal direction which is the same as a direction of sheet feeding, and rotating said separating roller in a reverse direction to the direction of the sheet feeding for separating sheet by sheet a plurality of said paper sheets piled on a paper sheet piling portion;

making a diameter of said separating roller smaller than that of said conveying roller; and making a frictional coefficient of said separating roller smaller than that of said conveying roller, and wherein said conveying roller and said separating roller are formed such that pitches between said convex portions are symmetrical on left and right sides of each of said conveying roller and said separating roller as defined along a rotational axis of each of said conveying roller and said separating roller, and the pitches become gradually large toward opposite external portions of each of said conveying roller and said separating roller, and wherein said conveying roller and said separating roller are opposed to each other such that the convex portions of one of said separating roller or said conveying roller is situated at center portions of the concave portions of the other of said separating roller and said conveying roller.

30. A method of separating and feeding paper sheets comprising the steps of:

providing at least one conveying roller and at least one separating roller respectively having convex portions brought into contact with said paper sheet and concave portions situated at the positions between said convex portions and not brought into contact with said paper sheet;

opposing said conveying roller and said separating roller to each other in a state of being stepped so as not to be brought into contact therewith;

rotating said conveying roller in a normal direction which is the same as a direction of sheet feeding, and rotating said separating roller in a reverse direction to the direction of the sheet feeding for separating sheet by sheet a plurality of said paper sheets piled on a paper sheet piling portion;

making a diameter of said separating roller smaller than that of said conveying roller; and making a frictional coefficient of said separating roller smaller than that of said conveying roller, and wherein said separating roller includes pitches P4 and P5 between respective convex portions and said conveying roller includes pitches P1, P2, and P3 between respective convex portions, the pitches of both said rollers are symmetrical to the left and right around center portions in axis line directions of both said rollers, and the pitches become gradually large toward an external position in axis line directions, so as to satisfy the following inequalities:

$P1<P2<P3$, and $P4<P5$, and wherein, said conveying roller and said separating roller are opposed to each other such that center portions of convex portions of said separating roller are located at center portions of concave portions of said conveying rollers, and center positions of convex portions of said conveying roller are located at center positions of concave portions of said separating roller.

* * * * *